UNITED STATES PATENT OFFICE.

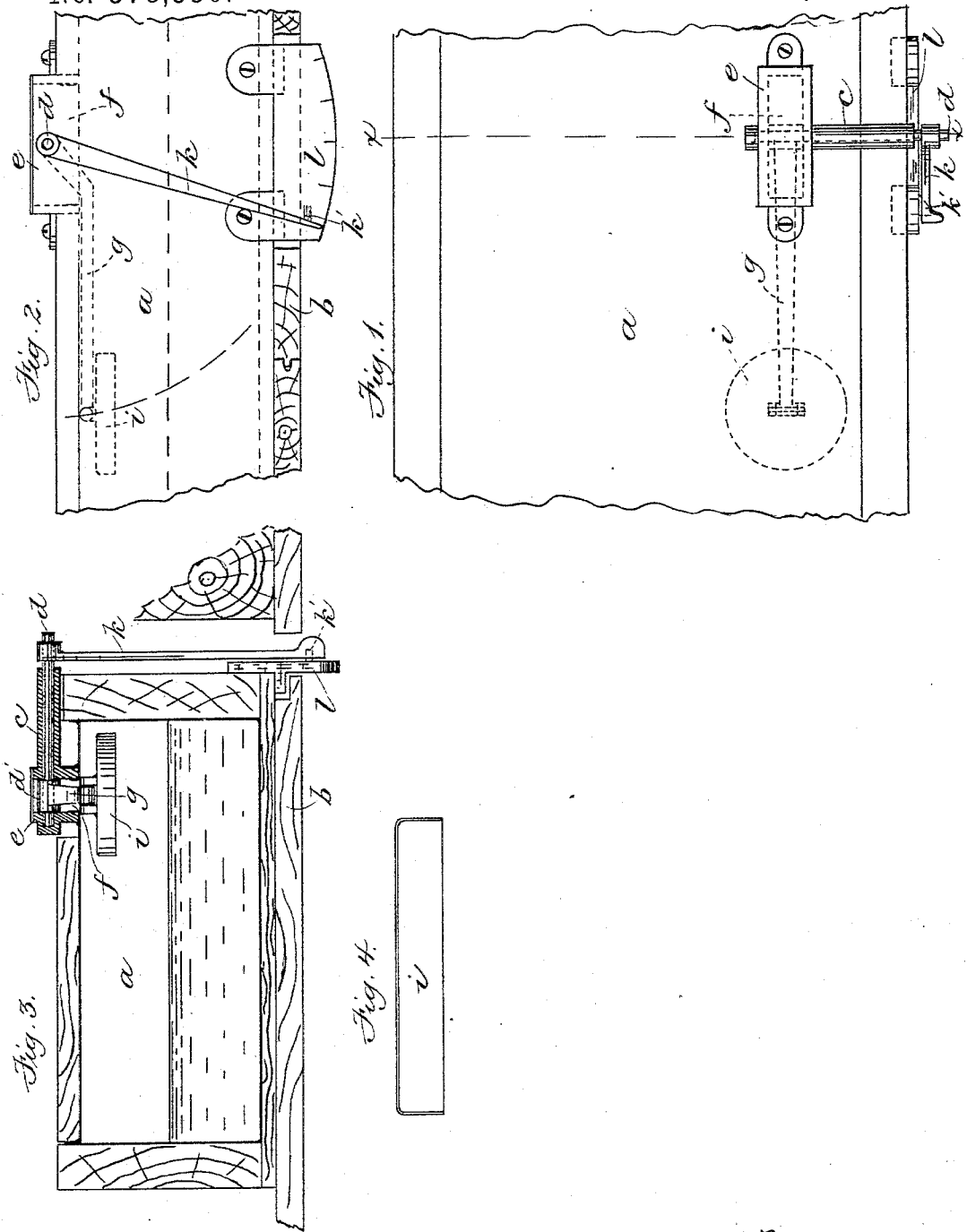

FRANK S. MASON, OF CAMBRIDGE, MASSACHUSETTS.

INDICATOR FOR OIL-TANKS.

SPECIFICATION forming part of Letters Patent No. 378,330, dated February 21, 1888.

Application filed January 15, 1887. Serial No. 224,403. (No model.)

*To all whom it may concern:*

Be it known that I, FRANK S. MASON, of Cambridge, in the county of Middlesex and State of Massachusetts, have invented certain new and useful Improvements in Indicators for Oil-Tanks, of which the following is a specification.

This invention relates to means for indicating the quantity of oil in the tank or reservoir that supplies oil to the burner of an oil-stove for freight-car-heating purposes, the tank being attached to the car and communicating with said burner. Heretofore indicating devices employed for this purpose have been a loose float within the tank, a cord or chain connected with the float and passing through an aperture in the top or cover of the tank over a suitable pulley or pulleys, and an indicator or finger which is connected with said cord or chain and is moved thereby over a graduated scale. Owing to the jolting and swaying movements of the car said devices have proved unsatisfactory and unreliable, a part of the oil being liable to escape through the opening through which the cord or chain passes, while said cord or chain and the sliding indicator operated thereby are liable to be clogged or caught and therefore fail to operate.

My invention has for its object to provide an indicator which shall be free from these and other objections attending the use of the devices heretofore employed; and to this end it consists, as a whole, in the combination, with the oil-tank, of a box or bearing, a shaft fitting said bearing closely and adapted to rock or rotate therein and having an arm projecting into the tank, a float connected to said arm and supported by the oil, and an indicating device outside of the tank operated by said shaft, all of which I will now proceed to describe.

Of the accompanying drawings, forming a part of this specification, Figure 1 represents a top view of a portion of the supply-tank of a car-heating oil-stove having my improvements. Fig. 2 represents an end view of the same. Fig. 3 represents a section on line $x\,x$, Fig. 1. Fig. 4 represents a sectional view of the preferred form of float.

The same letters of reference indicate the same parts in all the figures.

In the drawings, $a$ represents the tank, which is secured to a base or platform, $b$, under the floor of the car, said platform being attached to the frame-work or bottom of the car in any suitable manner. To the top of the tank is secured a journal box or bearing, $c$, in which is journaled a shaft, $d$, fitting the bearing so closely as to prevent the free escape of oil around the shaft.

$e$ represents an enlargement formed on or with the journal-box, and containing a chamber, $f$, communicating with the interior of the tank. Said chamber accommodates an arm, $g$, attached to the shaft and projecting into the tank, and permits said arm to swing and oscillate or rock the shaft. To the swinging end of the arm $g$ is pivoted a float, $i$, which is supported by the oil in the tank. One end of the shaft $d$ projects beyond the box or bearing $c$ and has attached to it an arm or pointer, $k$, which projects over a graduated plate, $l$, attached to the side of the tank or to any suitable part of the car.

It will be seen that the position of the float is determined by the height of the oil in the tank, and that the float, acting on the arm $g$ and shaft $d$, causes the pointer to move over the scale as the oil is lowered by consumption, and thus indicates the quantity in the tank.

The construction of the box or bearing $c$ and its enlargement is such that there can be no escape of oil through the chamber $f$ and the bearing, the shaft $d$ fitting the bearing so closely that there can be no leakage around the shaft. I prefer to provide the shaft with a collar or enlargement, $d'$, within the chamber $f$, said collar bearing against the sides of the chamber and preventing endwise movement of the shaft. It is obvious, however, that endwise movement of the shaft may be prevented by any other suitable means.

The shaft, prevented from endwise movement, keeps the float from moving about laterally in the tank, and constitutes a simple and positive device for communicating the motion of the float to the pointer or indicator. There is no liability of the clogging or catching of the operative devices, as is the case when a cord or chain is used to communicate motion from the float to the pointer; hence the indicator is much more reliable than those heretofore used.

I prefer to provide means for suspending and fastening the float above the oil, excepting when it is desirable to take indications, and then release and lower the float. To this end the pointer $k$ may be engaged by a fixed stud, $k'$, on the dial, as shown in Figs. 1, 2, and 3, said stud being in position to hold the arm $g$ and float $i$ elevated above the oil.

When it is desired to take an indication, the pointer is disengaged from the stud $k'$, whereupon the float falls to the surface of the oil. By this arrangement I prevent the constant wear of the operative devices, which would take place if the float were continually on the oil and moved by the constant movement thereof when the car is in motion. I also prevent the float from being filled or saturated with oil and thus made heavier than was intended.

I prefer to make the float $i$ as an inverted air-chamber or bottomless casing of metal, as shown in Fig. 4. This construction is preferred to a closed hollow float, because the latter is liable to have pin-holes in its solder-joints, through which oil may enter the float. The bottomless float when lifted from the oil is entirely freed from oil, and is ready for use whenever it is let down.

I claim—

1. The combination, with the tank having a horizontal top and adapted for attachment to the under side of a freight-car, of the horizontal bearing located in the top of said tank and having an enlargement formed on one end thereof and containing a chamber communicating with said tank, the shaft fitted in said bearing, the arm secured to said shaft in said chamber, the float attached to the other free end of said arm, the indicator arm or pointer, and the graduated plate, all constructed and arranged substantially as shown and described.

2. The combination, in a tank adapted for attachment to the under side of a freight-car, of a bearing located in the top of said tank, a shaft snugly incased in said bearing, a float connected with said shaft, and means for holding said shaft in a turned position to maintain the float in an elevated position, substantially as set forth.

In testimony whereof I have signed my name to this specification, in the presence of two subscribing witnesses, this 10th day of January, 1887.

FRANK S. MASON.

Witnesses:
C. F. BROWN,
ARTHUR W. CROSSLEY.